Patented May 28, 1940

2,202,325

UNITED STATES PATENT OFFICE 2,202,325

INSULIN COMPOSITION AND PROCESS OF PREPARING THE SAME

Raymond A. Warburton, Brooklyn, N. Y.

No Drawing. Application July 15, 1938,
Serial No. 219,461

8 Claims. (Cl. 167—75)

This invention relates to insulin compositions and processes of preparing the same, and it comprises, as a new composition of matter, the product obtained when insulin is treated with hexamine, it further comprises processes wherein solutions of insulin are admixed with a solution of hexamine and the reaction product recovered.

For many years, ever since the discovery of insulin, diabetes mellitus has been controlled by insulin therapy. Although the discovery of insulin and its use in the treatment of diabetes has been one of the most glorious advances in the history of medicine, and in diabetic therapy particularly, it has also been recognized that the standard commercial insulin preparations have faults as well as advantages.

Ordinary solutions of insulin used for subcutaneous injection must be administered, as a general rule, at least two or three times a day. Such insulin solutions tend to react rapidly on the patient, but the effect is not prolonged. This means, as stated, that a plurality of injections are ordinarily required.

More recently investigators in this field have sought to find insulin compositions in which, after injection, the insulin would be available immediately for its metabolic role but would have a prolonged effect thus avoiding the necessity for several injections during the course of twenty-four hours. Charts showing the blood sugar levels immediately before and after the administration of ordinary insulin, and for a time thereafter, show rather wide fluctuations. What the art has desired is an insulin compound which, when administered, would control the blood sugar level in a more normal manner and would keep this level near to normal over a much longer period of time.

To this end, it has hitherto been discovered that insulin can be combined with a protamine to give what is referred to as "protamine insulin." Just how the protamine reacts with the insulin is not definitely understood, but perhaps it can be likened to a kind of double salt formation. Protamine insulin, while a step forward in the art, nevertheless, has objections. Many patients are allergic to protamine insulin. The insulin portion of the protamine insulin molecule is not immediately available for controlling the metabolic rate and to counteract this deficiency both insulin and protamine insulin have been used at the same time. In this way the more immediate action of the simple insulin is combined with the delayed action of the protamine insulin. The injection of protamine insulin leads to local tissue irritation at the point of injection. This is a rather serious disadvantage since many patients will not tolerate the irritation. Moreover, high concentrations of protamine insulin in aqueous solutions clog the ordinary fine hypodermic needle. Patients requiring large doses of insulin experience considerable discomfort when relatively large volumes of protamine insulin of low strength (to permit use of ordinary 27 gauge needles) must be used.

Consequently, what the art desires is an insulin composition which has an immediate effect after injection, has no allergic manifestations, can be prepared in very high concentrations, thus lessening the volume of solution which must be injected, without, however, clogging the hypodermic needle, and has such prolonged and regular effect that a single daily injection is adequate for most people.

I have set myself to the problem of finding some substance which could be combined with insulin to give a product suitable for subcutaneous injection and having properties and advantages not hitherto realized in the art. And as a result of prolonged experimentation I have discovered that insulin will react with hexamine in some way to form a "hexamine-insulin" material satisfying the above-stated requirements and having none of the disadvantages of either ordinary standard insulin or protamine insulin. My experiments indicate that of the many amines I have tested only hexamine has properties suiting it for the purpose required.

Hexamine, which is another name for hexamethylenetetramine, and is also sometimes referred to as methenamine or urotropine, is a substance highly soluble in water and has been used therapeutically by physicians for over thirty years. Daily doses as large as 90 grains even with water restrictions can be administered, and such doses exert no perceptible effect upon the system. Consequently, the hexamine itself is without allergic manifestations or other disadvantages.

Hexamine, I have discovered, reacts or coacts with insulin to form some kind of a compound in which the ordinary properties of insulin are greatly modified. The precise nature of the compound is not understood. If hexamine, in aqueous solution, be added to an insulin solution the hexamine-insulin precipitates. The precipitate itself redissolves upon the addition of hydrochloric acid.

The hexamine-insulin compound of my invention can be prepared in many ways, either by starting with beef pancreas and isolating insulin therefrom, or by starting with ordinary commercial insulin available in the open market.

For example, I treat 200 grams of fresh, cold, macerated beef pancreas with 400 cubic centimeters of 95% alcohol containing a very small amount of hydrochloric acid, about 4% based on the amount of alcohol. This is one of the customary ways of extracting insulin from the pancreas. After filtering the alcoholic mixture I add to the filtrate, drop by drop, an aqueous solution containing 64.8 mg. of hexamine per cubic centimeter until no further precipitation occurs. The mixture is then centrifuged to throw down the precipitate and the supernatant liquid poured off. The precipitate is next washed with water several times and finally taken up in water containing enough hydrochloric acid to dissolve the precipitate. On injecting this solution into rabbits and examining their blood for sugar I find that hexamine insulin compound functions to reduce blood sugar levels.

In another alternative of my process I add one-tenth normal sodium hydroxide, drop by drop, to 10 cubic centimeters of U80 standard insulin solution until no further precipitation occurs. At this point the pH of the solution is about 5.3. I next centrifuge to throw down the precipitate and pour off the supernatant fluid. 20 cubic centimeters of water are then added to the precipitate followed by one-tenth normal hydrochloric acid, drop by drop, with agitation until the precipitate dissolves. This process is repeated three or four times for the purpose of removing tricresol, glycerine, and buffer substances contained in the original insulin solution. After resolution and reprecipitation in the manner stated a small quantity of water is added to the precipitate which is again dissolved by the addition of the dilute hydrochloric acid, added drop by drop. This gives me an aqueous solution containing insulin. To the insulin solution I then add enough hexamine solution to precipitate the insulin. In this case 0.4 cubic centimeters of a solution containing 64.8 mg. of hexamine per cubic centimeter are added. The mixture is cloudy and enough water can be added to it to bring the mixture to any desired strength. If enough water is added to bring the final volume to 10 cubic centimeters I obtain a product having a concentration of 80 insulin units. If the final volume is regulated to 8 cubic centimeters the product has a concentration of 100 insulin units.

This cloudy solution needs no further treatment. It can be injected through the ordinary 27 gauge hypodermic needle without clogging.

The solution can be cleared, if desired, by adding small amounts of one-tenth molar phosphoric acid solution. A slight excess beyond the quantity required to clear the cloudy starting solution is satisfactory. The amount of phosphoric acid of the strength stated is usually about 2 cubic centimeters per 20 cubic centimeters of cloudy hexamine-insulin solution having a strength of 200 insulin units. The amount of phosphoric acid to be used may vary somewhat but can be readily determined by visual inspection as the acid is added.

Instead of using phosphoric acid solution I can use one-tenth normal lactic solution for clearing the cloudy hexamine-insulin solution. Approximately the same quantities of one-tenth normal lactic acid are required.

I have also discovered that the addition of one-fifth normal hydrochloric acid in place of phosphoric acid will clear the solution but in time this preparation shows slight signs of precipitation. Disodium phosphate and sodium hydroxide together will clear a cloudy hexamine-insulin solution. For example, to each 3 cubic centimeters of such a cloudy hexamine-insulin solution prepared as described above and having a strength of 286 insulin units, I add 1 cubic centimeter of disodium phosphate solution having a pH of 8 and the 0.3 cubic centimeter of one-tenth normal sodium hydroxide. This gives a clear alkaline solution having a pH of about 7.75 and a potency of 200 insulin units.

Instead of first removing buffer substances and other addition agents from the commercial insulin solution, I can add a stronger hexamine solution directly to the standard insulin solution and obtain a hexamine-insulin solution having about the same potency of the original insulin starting solution. Thus it is unnecessary to remove buffer salts and the like from the insulin solution before forming my hexamine-insulin.

Both the cloudy and clear hexamine-insulin solutions have been used to a wide extent clinically on diabetics and the clinical results are substantially the same. Hexamine-insulin has been used on mild, moderate, severe, and extremely severe cases of diabetes mellitus, and on patients whose ages range from 8 to 70 years in whom the duration of the disease has been from two months to twenty-two years.

Over twelve thousand sugar determinations as well as a great number of urine analyses have been made in the course of my work.

I find that a single daily subcutaneous injection of my hexamine-insulin solution of the right dosage (depending upon the patient's requirements) is enough for the great majority of diabetics over a period of twenty-four hours. The single daily dose of hexamine-insulin is equal to the daily sum of the doses of ordinary standard insulin required. Conversion to hexamine-insulin therapy from ordinary insulin therapy is, therefore, a very simple matter.

I found that the best dietary regulation, when hexamine-insulin is used, is to distribute the daily carbohydrate as follows: breakfast ⅓, noon ½, and evening ⅙; this supplies carbohydrate in relation to the peak action of hexamine-insulin. The daily dose is best administered before breakfast, in a single subcutaneous injection. In a study of the hourly blood sugar determinations of patients receiving hexamine-insulin, I found that there is the immediate effect as obtained with standard insulin, which is prolonged for about twenty hours. I found that hexamine-insulin rapidly controls ketonuria, doing so before the sugar disappears from the urine. The size of the particles in the concentrated cloudy preparation are of such fineness that the mixture passes readily thru a fine needle, such as 27 gauge, an advantage over suspensions which clog such needles, in that a fine gauge needle is less unpleasant for a diabetic person to use continuously. Some physicians and patients have expressed a preference for the clear and some for the cloudy preparation.

In order to obtain a comparison of the effects of hexamine-insulin with standard insulin and with protamine-insulin, a small group of extremely severe diabetics was treated with each of these preparations and observed in detail. Special effort was used to make this a truly comparative study. A study of the blood sugar curves of this group revealed that hexamine-insulin exhibited an immediate action similar to that of insulin, but not observed with protamine-insulin. There was also a prolonging of the initial immediate action which is absent in the case of insulin, altho manifest with protamine after the effect of the latter has begun, which is usually about five hours after the time of injection. My study disclosed further that my invention converts polyuria to normal output in cases where I was unable to accomplish this by any other means. I have met with no allergic manifestations during the use of hexamine-insulin; whereas, I witnessed several cases of foreign protein reaction in the use of protamine-insulin, all of which, I am satisfied, were attributable to the added protein and not to the insulin, because on using regular insulin the reactions were absent and on using protamine-insulin they were present. In none of the cases have I been able to find local tissue irritation at the sites of injection, altho I did so find in the case of protamine-insulin. I have been able to prepare my product in far greater concentrations (U100, U200, U300, U1000) than I can obtain with protamine-insulin, without its clogging the ordinary fine (27 gauge) hypodermic needle; and patients who require large doses of insulin were grateful for this characteristic, because the discomfort of such injections bears a direct relation to the bulk of the liquid injected. The clear solution of my invention obviously passes readily thru any hypodermic needle, and has the additional advantage of not requiring agitation before use to distribute the active agent equally thruout the medium; it furthermore, has the advantage that it may be sterilized by the filtration method. In response to glucose ingestion, I found hexamine-insulin shock was more like standard insulin shock than protamine-insulin shock.

I ordinarily do not dry the hexamine-insulin precipitate prior to preparing solutions for injection, but, of course, the wet hexamine-insulin precipitate can be dried at room temperature in a current of very dry air. Elevated drying temperatures must be avoided.

As stated, the exact composition of my product is not clearly understood. The hexamine-insulin may be a chemical union of hexamine and insulin, or possibly a physical union of the hexamine and the insulin.

This application is a re-file for abandoned application Serial No. 155,020 in the names of Raymond A. Warburton and Henry M. Feinblatt.

Having thus described my invention, what I claim is:

1. Hexamine-insulin.
2. An aqueous mixture, suitable for subcutaneous injection, containing hexamine-insulin.
3. The process which comprises treating a solution containing insulin with a solution of hexamine.
4. A clear aqueous solution of hexamine-insulin.
5. In the process of preparing clear solutions of hexamine insulin from cloudy solutions thereof, the step which consists in acidifying the cloudy solution.
6. In the process of preparing clear solutions of hexamine insulin the step which consists in acidifying the cloudy solution with phosphoric acid.
7. A hexamine insulin solution for injection having a concentration of at least 100 units and capable of being used with 27 gauge hypodermic needles without clogging.
8. A hexamine insulin solution for injection having a concentration of between 100 units and 1000 units and capable of being used with 27 gauge hypodermic needles without clogging.

RAYMOND A. WARBURTON.